United States Patent
Takeda et al.

(10) Patent No.: US 8,208,687 B2
(45) Date of Patent: Jun. 26, 2012

(54) MILLIMETRIC WAVE IMAGING DEVICE AND CAPTURED IMAGE DISPLAY DEVICE

(75) Inventors: Masamune Takeda, Nisshin (JP); Masatoshi Sugita, Nisshin (JP); Jun Uemura, Nisshin (JP)

(73) Assignee: Masprodenkoh Kabushikikaisha, Nisshin-shi, Aichi (JP)

( * ) Notice: Subject to any disclaimer, the term of this patent is extended or adjusted under 35 U.S.C. 154(b) by 493 days.

(21) Appl. No.: 12/532,756

(22) PCT Filed: Mar. 13, 2008

(86) PCT No.: PCT/JP2008/054634
§ 371 (c)(1),
(2), (4) Date: Sep. 23, 2009

(87) PCT Pub. No.: WO2008/117674
PCT Pub. Date: Oct. 2, 2008

(65) Prior Publication Data
US 2010/0104193 A1    Apr. 29, 2010

(30) Foreign Application Priority Data
Mar. 26, 2007   (JP) ................................. 2007-079842

(51) Int. Cl.
*G06K 9/00* (2006.01)
(52) U.S. Cl. ...................... 382/103; 359/212.1; 343/761
(58) Field of Classification Search .................. 382/100, 382/103; 359/212.1, 220.1, 196.1, 197.1; 343/755, 761, 776, 779
See application file for complete search history.

(56) References Cited

U.S. PATENT DOCUMENTS

| | | | |
|---|---|---|---|
| 5,237,334 A * | 8/1993 | Waters | 343/753 |
| 6,034,642 A * | 3/2000 | Kojima et al. | 343/753 |
| 6,417,502 B1 * | 7/2002 | Stoner et al. | 250/208.1 |
| 6,762,709 B2 | 7/2004 | Kikuchi et al. | |
| 7,443,560 B2 * | 10/2008 | Anderton et al. | 359/212.1 |
| 7,785,098 B1 * | 8/2010 | Appleby et al. | 425/470 |
| 2002/0044276 A1 * | 4/2002 | Stoner et al. | 356/141.1 |
| 2002/0164957 A1 | 11/2002 | Lovberg et al. | |
| 2003/0002123 A1 | 1/2003 | Worner et al. | |
| 2006/0220952 A1 | 10/2006 | Aoki | |
| 2008/0246684 A1 * | 10/2008 | Fujishima et al. | 343/876 |
| 2010/0149061 A1 * | 6/2010 | Haziza | 343/779 |

FOREIGN PATENT DOCUMENTS

| | | |
|---|---|---|
| JP | 06-331725 A | 12/1994 |
| JP | 09-027927 A | 1/1997 |
| JP | 2009-197042 A2 | 7/1997 |
| JP | 10-073434 A | 3/1998 |
| JP | 10-082851 A | 3/1998 |
| JP | 2003-066359 A | 3/2003 |
| JP | 2003-177175 A | 6/2003 |
| JP | 2005-024378 A | 1/2005 |
| JP | 2006-279776 A | 10/2006 |
| JP | 2007-502415 A2 | 2/2007 |

* cited by examiner

*Primary Examiner* — Anand Bhatnagar
(74) *Attorney, Agent, or Firm* — GrayRobinson, P.A.

(57) ABSTRACT

A millimetric wave imaging device includes: a lens antenna; a polygon mirror; a receiving portion; a scanning unit; and an image data generating unit. The receiving portion receives millimetric wave radiated from an object, transmitted through the lens antenna, and reflected on a mirror surface of the polygon mirror rotated by the scanning unit to detect a signal level of the millimetric wave. The image data generating unit generates image data representing an object image by receiving a detection signal from the receiving portion while driving the polygon mirror through the scanning unit.

6 Claims, 5 Drawing Sheets

MILLIMETRIC WAVE IMAGING DEVICE AND CAPTURED IMAGE DISPLAY DEVICE

CROSS REFERENCED TO RELATED APPLICATIONS

This is a U.S. National Phase Entry under 35 U.S.C. §371 of, and claims priority under 35 U.S.C. Sections 119(a)-(d). 120, 363 and 365 to, International Application No. PCT/JP2008/054634, filed Mar. 13, 2008 which designated the United States and at least one other country in addition to the United States and claimed priority to Japanese Application No. 2007-079842, filed Mar. 26, 2007. The specifications of these applications are hereby expressly incorporated by reference in their entirety to form a part of this application.

TECHNICAL FIELD

The present invention relates to a millimetric wave imaging device that receives millimetric wave radiated from an object such as human body to image the object and a captured image display device that displays a captured image.

BACKGROUND ART

Conventionally, it has been suggested that receiving millimetric wave radiated from an object such as human body to image the object and detecting a metallic or non-metallic weapon or smuggled goods hidden in the object from the captured image (for example, Patent Documents 1 and 2).

In this type of millimetric wave imaging device, a planar antenna in which a plurality of antenna elements are arranged in a two-dimensional form is used as an antenna for receiving millimetric wave and an object image using the millimetric wave is formed on a surface of the planar antenna through a lens antenna, so that the object image is received from each antenna element of the planar antenna.

Patent Document 1: Japanese Unexamined Patent Publication No. 09-197042
Patent Document 2: Japanese Unexamined Patent Publication No. 2003-177175

DISCLOSURE OF THE INVENTION

Problems to be Solved by the Invention

However, when the planar antenna is used to capture an object image as the prior art, the plurality of antenna elements should be arranged in the two-dimensional form at a receiving portion for the millimetric wave, so that a problem occurs in which the receiving portion is enlarged and the cost may be increased.

The present invention has been made to solve the above problem. A purpose of the present invention is to downsize a receiving portion and to reduce costs in a millimetric wave imaging device that uses millimetric wave radiated from an object to image the object.

Means for Solving the Problems

A millimetric wave imaging device according to a first aspect of the invention to accomplish the purpose comprises a lens antenna that transmits millimetric wave radiated from an object to form an object image using the millimetric wave at a predetermined rear position; a polygon mirror that is arranged in a proximity of an object image forming position of the lens antenna, a side wall thereof forming a polyhedron around an rotation axis and being formed as a mirror surface reflecting the millimetric wave forming the object image; a receiving portion that receives the millimetric wave reflected on the mirror surface of the polygon mirror to detect a signal level thereof; a scanning unit that reflects the millimetric wave at each position of the object image to the receiving portion by rotating the polygon mirror around the central rotation axis and around an axis perpendicular to the central rotation axis; and an image data generating unit that generates image data representing the object image by receiving a detection signal from the receiving portion while driving the polygon mirror through the scanning unit.

A second aspect of the invention provides the millimetric wave imaging device according to the first aspect wherein the receiving portion is configured to be able to change a frequency of the millimetric wave whose signal level is to be detected, and the image data generating unit changes the frequency of the millimetric wave for which the receiving portion detects the signal level to generate a plurality of types of image data and synthesizes the image data to generate final image data.

Third and fourth aspects of the invention provide an image display device that displays on a display unit an image captured by the millimetric wave imaging device according to the first or second aspect.

An image display device according to a third aspect of the invention comprises a storage unit that stores shape data of an article to be inspected; an article recognizing unit that searches the image data generated by the millimetric wave imaging device based on the shape data stored in the storage unit to determine whether or not the article is included in the captured image; and a display control unit that, when it is determined by the article recognizing unit that the article is included in the captured image, displays the captured image on the display unit based on the image data generated by the millimetric wave imaging device. and, a symbol mark schematically representing the article in the displayed image, and when it is not determined by the article recognizing unit that the article is included in the captured image, displays only the captured image on the display unit.

An image display device according to a fourth aspect of the invention comprises a storage unit that stores identification data for specifying an object and an article to be inspected from pixel values of image data generated by the millimetric wave imaging device based on thermal noises of the object and the article; a position specifying unit that searches the image data generated by the millimetric wave imaging device, based on the identification data stored in the storage unit, to specify positions of the object and the article in the captured image; and a display control unit that displays the captured image on the display unit based on the image data generated by the millimetric wave imaging device and highlights the object and the article having the positions specified by the position specifying unit in the displayed image so as to distinguish the object and the article from the other display areas.

Effects of the Invention

In the millimetric wave imaging device according the first aspect of the invention, the polygon mirror is arranged in the proximity of the object image forming position of the lens antenna.

According to the invention, through the scanning unit, the image data generating unit rotates the polygon mirror around the central rotation axis to scan the object image using the millimetric wave in a first axis (x-axis) direction perpendicular to the central rotation axis of the polygon mirror and thus to sequentially reflect the millimetric waves of the object image on the x-axis to the receiving portion.

In addition, through the scanning unit, the image data generating unit rotates, the polygon mirror around the axis perpendicular to the central rotation axis to scan the object image using the millimetric wave in a second axis (y-axis) direction parallel to the central rotation axis of the polygon mirror and thus to sequentially reflect the millimetric waves of the object image on the y-axis to the receiving portion.

As a result, detection signals are outputted from the receiving portion, which represent signal levels of the millimetric waves of each part of the object image obtained by scanning the object image in the x-y axis directions. The image data generating unit sequentially receives the detection signals to generate image data representing the object image.

Thus, according to the millimetric wave imaging device of the invention, it is possible to capture a millimetric wave image by using the polygon mirror and the one receiving portion. Further, since it is not necessary to use a planar antenna in which a plurality of antenna elements are arranged in a two-dimensional form as the prior art, it is possible to downsize the millimetric wave imaging device and to reduce the costs.

In the millimetric wave imaging device according to the second aspect of the invention, the image data generating unit changes the frequency of the millimetric wave for which the receiving portion detects the signal level, thereby generating the plurality of types of image data and synthesizing the generated plurality of image data to generate final image data.

Due to this, according to the millimetric wave imaging device of the invention, even when a member exists around the object, which absorbs the millimetric wave of a specific frequency, the image data to be finally obtained become image data corresponding to the object image and the object can be imaged more favorably.

In the image display device according to the third aspect of the invention, the storage unit storing the shape data of an article to be inspected is provided so as to automatically determine whether or not the article hidden in the object exists from the image (captured image) of the object captured by the millimetric wave imaging device. The article recognizing unit searches the image data, based on the stored shape data, thereby determining whether or not the article is included in the captured image.

When it is determined by the article recognizing unit that the article is included in the captured image, the display control unit displays the captured image on the display unit based on the image data generated by the millimetric wave imaging device and a symbol mark schematically representing the article in the displayed image. In addition, when it is not determined by the article recognizing unit that the article is included in the captured image, the display control unit displays only the captured image on the display unit.

Due to this, according to the image display device of the invention, when the article to be inspected is hidden in the object, the fact is automatically detected, so that a symbol mark of the article can be displayed on the display screen of the captured image. Thus, from the displayed image, an inspector can easily find out the article hidden in the object.

In other words, as described in the above mentioned Patent Documents 1 and 2, the millimetric wave imaging device captures the image of the object by using the millimetric wave radiated from the object such as human body, and thereby a metallic or non-metallic weapon or smuggled goods hidden in the clothes and the like and thus unseen can be imaged. The device is often used for a security check in an airport and so on.

However, the captured image (so-called projected image) obtained by using the millimetric wave is not clear, as compared to an optical image. Thus, when it is intended to find out an article to be inspected from the captured image, an inspector's experience is required. Further, it is difficult for an inexperienced inspector to find out the article from the captured image.

Regarding this, according to the invention, the shape data of an article to be inspected is registered in advance and is used to determine whether or not the article appears in the captured image. The determination result is displayed as a symbol mark of the article on the display unit together with the captured image, so that an inspector can easily find out the article hidden in the object.

Thereby, according to the image display device of the third aspect, the device is used for a security check in an airport and the like, so that it is possible to detect an illegal article hidden in the object easily and precisely, thereby improving the safety of an airplane and the like.

In the image display device according to the fourth aspect of the invention, there is provided the storage unit that stores identification data for specifying an object and an article to be inspected from pixel values of image data generated by the millimetric wave imaging device, based on thermal noises of the object and the article. The position specifying unit searches the image data based on the identification data, thereby specifying positions of the object and the article in the captured image.

The display control unit displays the captured image on the display unit based on the image data generated by the millimetric wave imaging device and highlights the object and the article having the positions specified by the position specifying unit in the displayed image so as to distinguish the object and the article from the other display areas.

Thus, according to the image display device of the fourth aspect, as compared to the case where the image data generated by the millimetric wave imaging device are used, without modification, to display an image of the object (which is called as a gradation display), it is possible to intelligibly display an article hidden in the object. Hence, an inspector can easily find out the article to be inspected from the displayed image.

Thereby, also in the image display device of the fourth aspect, the device is used for a security check in an airport and the like, so that it is possible to detect an illegal article hidden in the object easily and precisely, thereby improving the safety of an airplane and the like.

DESCRIPTION OF REFERENCE NUMERALS

2: object, 4: inspection object, 10: security check device, 12: lens antenna, 14: polygon mirror, 15: base, 16: motor for adjusting an azimuth, 17: motor for adjusting an elevation angle, 18: objective lens, 20: receiving portion, 21: receiving antenna, 22: amplifying circuit, 23, 26: route switching switch, 24, 25: band pass filter (BPF), 27: detector circuit, 30: image processor, 32: position controller, 34: input device, 35: display, 36: display controller, 38: external storage device

BEST MODE FOR CARRYING OUT THE INVENTION

In the followings, an embodiment of the invention will be described.

Figure 1:
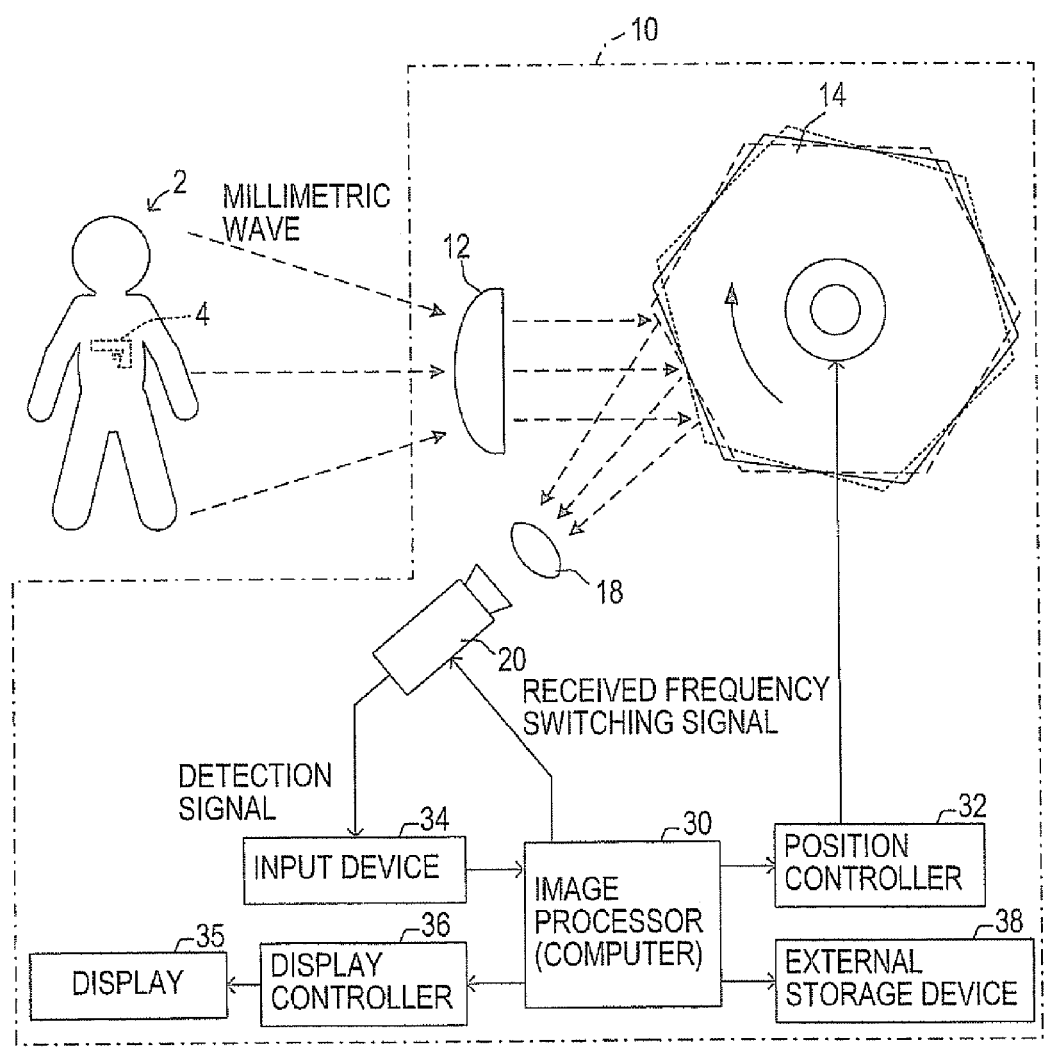
FIG. 1 is a block diagram showing a structure of a security check device according to an embodiment.

FIG. 1 is a block diagram showing a structure of a security check device 10 to which the invention is applied.

The security check device 10 of this embodiment is used to check whether or not a passenger hides a dangerous article at an airport and the like, and serves as an imaging device that images a passenger as an object 2 and a display device that displays an image of the captured object 2 (captured image) on a display 35.

Specifically, as shown in FIG. 1, the security check device 10 of this embodiment is provided with a lens antenna 12 that receives millimetric wave radiated from the object 2 in the device and forms an object image using the millimetric wave, a polygon mirror 14 that is arranged in a proximity of an object image forming position of the lens antenna 12 and whose sidewall is formed as a metallic mirror surface reflecting the millimetric wave forming the object image, a receiving portion 20 that receives the millimetric wave reflected on the mirror surface of the polygon mirror 14 and detects a signal level thereof, and an objective lens 18 that guides the millimetric wave reflected on the mirror surface of the polygon mirror 14 to the receiving portion 20.

Here, the polygon mirror 14 is configured to be a regular polyhedron (a regular hexahedron in this embodiment), seen from the top, by combining a plurality of planar-plate-like sidewalls (six sidewalls in this embodiment), each of which is formed to be able to reflect the millimetric wave. In FIG. 1, although the polygon mirror 14 seen from the top is shown so as to easily understand a shape of the mirror surface, the object 2 seen from the lateral direction (horizontal direction) is shown.

Figure 2:
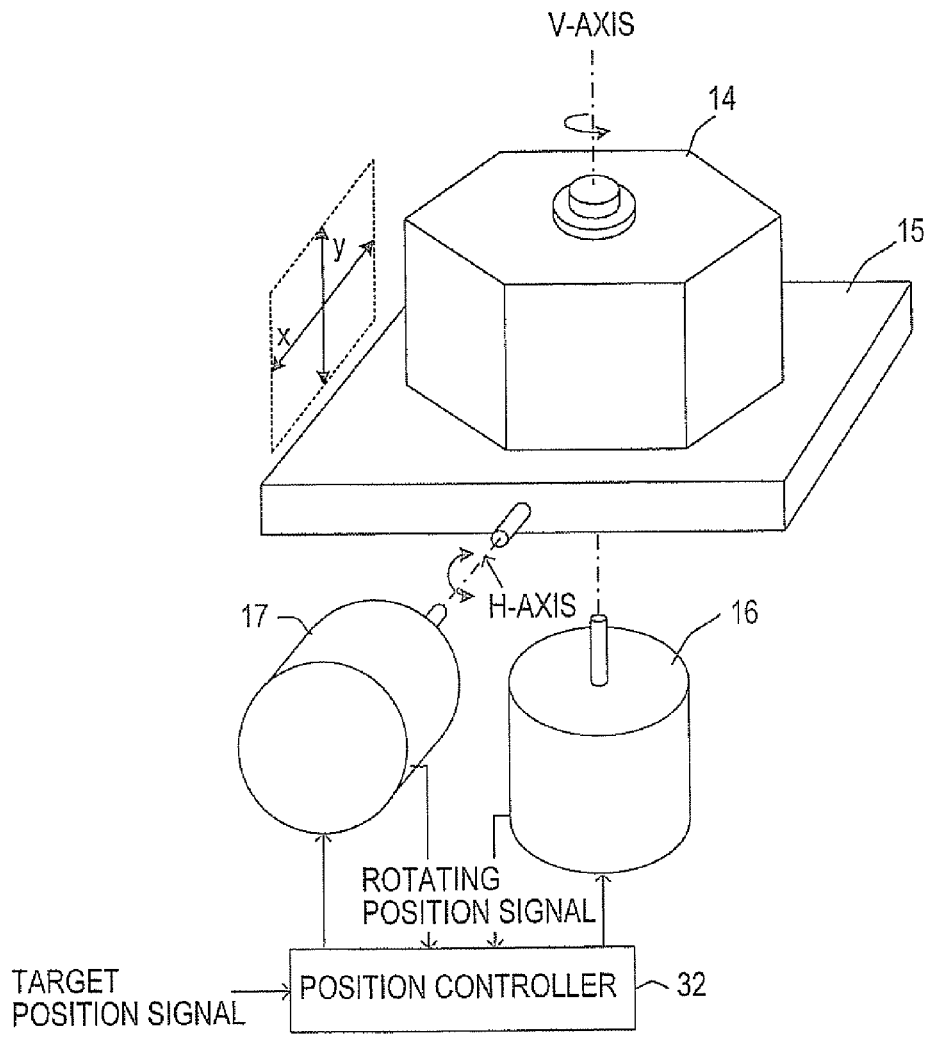
FIG. 2 is a view illustrating structures of a polygon mirror and a driving system thereof.

As shown in FIG. 2, the polygon mirror 14 is provided to be rotatable around a central rotation axis V, which is a center of the regular polyhedron, with respect to a base 15. The base 15 is provided with a motor 16 for adjusting an azimuth that rotates the polygon mirror 14 in one direction (arrow direction in FIG. 1) around the central rotation axis V.

The central rotation axis V is a vertical axis. In this embodiment, the polygon mirror 14 is rotated around the V axis through the motor 16 for adjusting an azimuth, thereby scanning the mirror surface of the polygon mirror 14 at the side of the lens antenna 12 in an x-axis direction perpendicular to the central rotation axis V to enable the millimetric waves of the object image on the horizontal axis (x-axis) to sequentially enter the receiving portion 20.

In addition, the base 15 of the polygon mirror 14 is provided with a motor 17 for adjusting an elevation angle that rotates the base 15 around a H axis (horizontal axis) perpendicular to the central rotation axis V of the polygon mirror 14.

Due to this, according to this embodiment, the base 15 is rotated around the H axis by the motor 17 for adjusting an elevation angle, thereby scanning the mirror surface of the polygon mirror 14 at the side of the lens antenna 12 in a y-axis direction parallel to the central rotation axis V to enable the millimetric waves on the vertical axis (y-axis) of the object image to sequentially enter the receiving portion 20.

In other words, according to this embodiment, it is possible to adjust each of an incident azimuth and an elevation angel of the millimetric wave with respect to the device 10, which is reflected on the mirror surface of the polygon mirror 14 at the side of the lens antenna 12 and then enters the receiving portion 20, by driving the motor 16 for adjusting an azimuth and the motor 17 for adjusting an elevation angle.

Each of the motor 16 for adjusting an azimuth and the motor 17 for adjusting an elevation angle is provided therein with a rotary encoder (not shown) that detects a rotating position thereof. A rotating position signal from each rotary encoder of the motors 16, 17 is inputted to a position controller 32 that controls the rotating position of each of the motors 16, 17 to adjust a direction of the mirror surface of the polygon mirror 14.

In addition, based on the rotating position signals inputted from the rotary encoders and a target position signal inputted from an after-mentioned image processor 30, the position controller 32 controls the rotating positions of the motors 16, 17 (further, the direction of the mirror surface of the polygon mirror 14) to a predetermined position that is instructed by the target position signal from the image processor 30.

Figure 3:
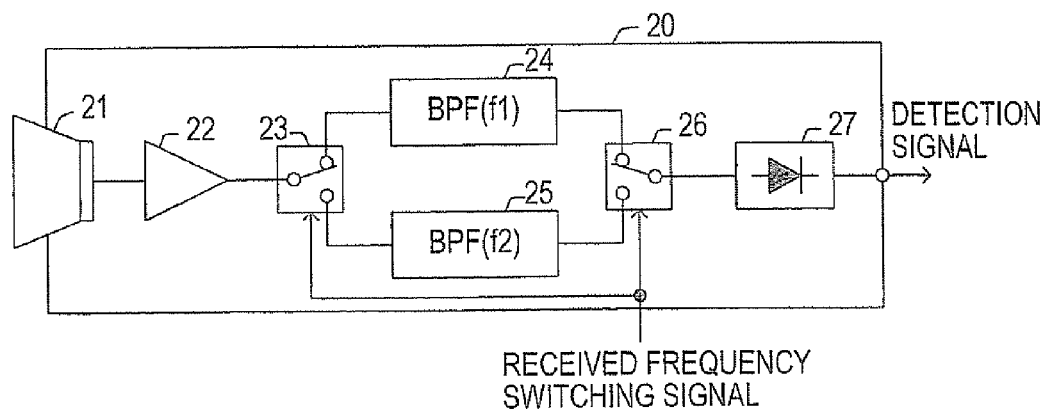
FIG. 3 is a block diagram showing a structure of a receiving portion.

Then, as shown in FIG. 3, the receiving portion 20 comprises a receiving antenna 21, an amplifying circuit 22 that amplifies a received signal from the receiving antenna 21, band pass filters (BPFs) 24, 25 of two types that selectively pass a received signal of a first frequency band f1 (for example, 75 GHz) and a received signal of a second frequency band f2 (for example, 50 GHz) from the received signal amplified by the amplifying circuit 22, respectively, route switching switches 23, 26 that input the received signal from the amplifying circuit 22 into one of the two BPFs 24, 25 and extracts the received signal from the BPF 24 or 25 to which the received signal is inputted, and a detector circuit 27 that detects the received signal of the first frequency band f1 or second frequency band f2 having passed the BPF 24 or 25 on a signal route formed via the route switching switch 23 and detects a signal level thereof.

In the receiving portion 20, whether to detect the received signal of the first frequency band f1 or to detect the received signal of the second frequency band f2 through the route switching switches 23, 26 is switched by a received frequency switching signal, which is inputted from the image processor 30 shown in FIG. 1. In addition, a detection signal outputted from the detector circuit 27 is inputted to the image processor 30 through an input device 34 constituted by an A/D converter and the like.

The image processor 30 is constituted by a microcomputer. The image processor 30 receives the detection signal from the receiving portion 20 through the input device 34 and generates image data representing a two-dimensional image of the object 2 while driving the polygon mirror 14 through the position controller 32 to change the millimetric wave incident on the receiving portion 20 in the x-axis and y-axis directions of the object image.

Additionally, the image processor 30 is connected with a display controller 36 that displays an image (captured image) of the object 2 on the display 35 based on the generated image data and an external storage device 38 constituted by a memory, a hard disk and the like that stores the image data.

Figure 4:
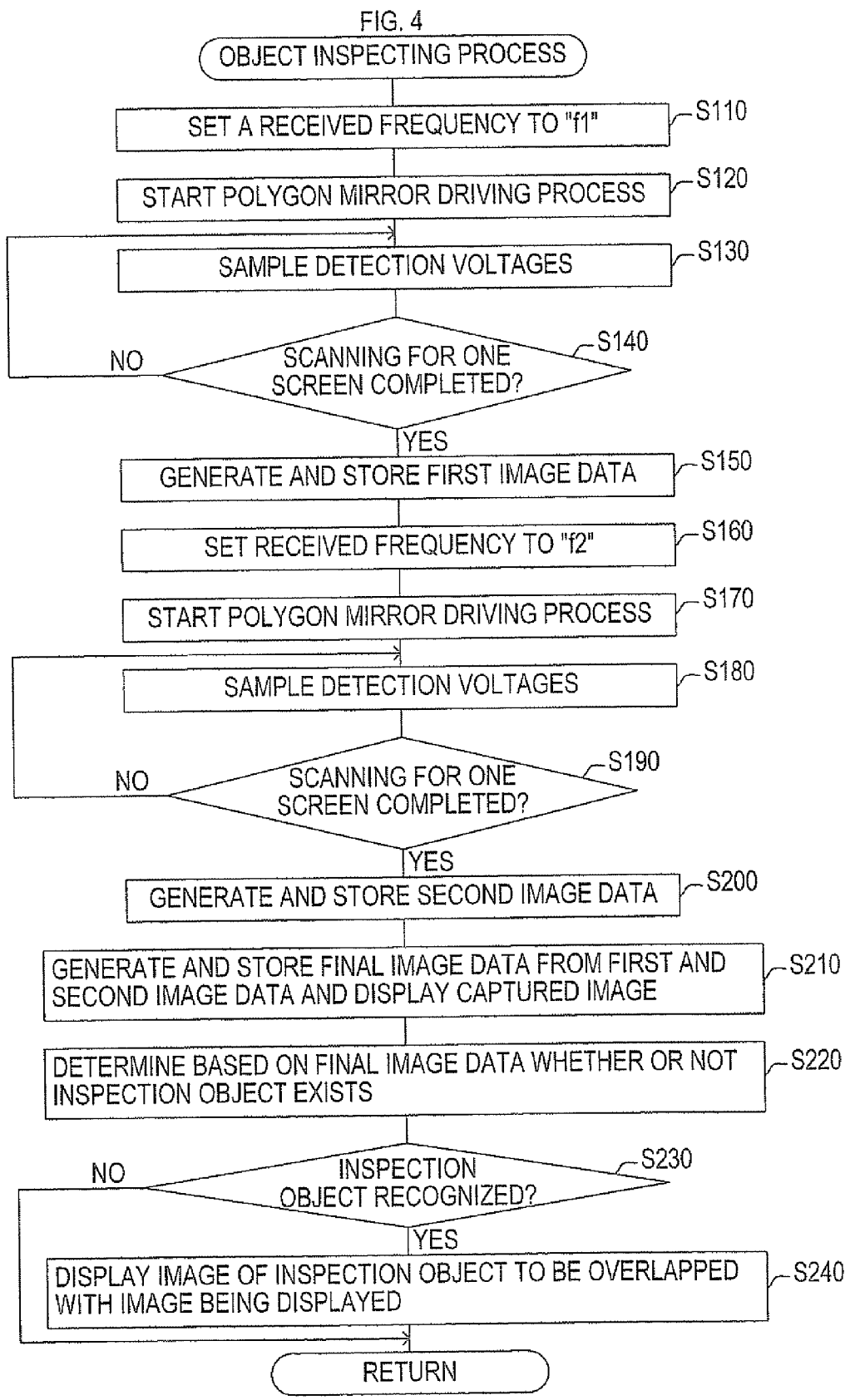
FIG. 4 is a flow chart showing an object inspecting process executed by an image processor.

FIG. 4 is a flow chart showing an object inspecting process that is executed by the image processor 30.

When executing the object inspecting process, it is assumed that pattern data (shape data) of an image representing a weapon shape such as gun, knife and the like, which is an inspection object 4 (see FIG. 1), is stored in the external storage device 38 serving as storage unit.

The object inspecting process is a process for imaging the object 2 to inspect whether or not a passenger who is the object 2 hides an article, which is not allowed to bring in a plane (for example, a weapon such as gun, knife and the like), from the captured image, and displaying an inspection result on the display 35 together with the captured image, and is repeatedly executed after turning on the image processor 30.

As shown in FIG. 4, according to the object inspecting process, in S110 (S indicates a step), a received frequency switching signal to be outputted to the receiving portion 20 is set to be a low level, for example, thereby switching the route switching switches 23, 26 to the BPF 24 side and setting the received signal detected by the detector circuit 27 to the first frequency band f1.

Then, in S120, driving process of the polygon mirror 14 is started in which the target position signals outputted to the position controller 32 are sequentially changed to change an azimuth of the mirror surface of the polygon mirror 14 to the x-axis direction and thus to scan the object image in the horizontal direction while an elevation angle of the mirror surface of the polygon mirror 14 is changed in the y-axis direction by a predetermined angle every horizontal scanning to scan the object image in the vertical direction.

In S130, a sampling process of receiving the detection signal (detection voltage) inputted through the input device 34 is executed in connection with the driving process of the polygon mirror 14. In S140, it is determined whether or not the sampling process has been executed for the object image for one screen, so that it is determined whether or not the scanning of the object image for one screen has been completed.

When the scanning of the object image for the one screen has not been completed, the process again proceeds to S130. To the contrary, when the scanning of the object image for the one screen has been completed, the process proceeds to S150 in which first image data based on the millimetric wave of the first frequency band f1 is generated from the detection voltage of the object image for the one screen sampled in S130 and then temporarily stored in the external storage device 38.

Like this, when the first image data is generated and stored, the process proceeds to S160 in which the received frequency switching signal outputted to the receiving portion 20 is changed to a high level, for example, thereby switching the route switching switches 23, 26 to the BPF 25 side and changing the received signal detected by the detector circuit 27 to a second frequency band f2.

Subsequently, in S170, the driving process of the polygon mirror 14 is started as in the above-mentioned S120, and in S180, the sampling process as in the above-mentioned S130 is executed.

Next, in S190, it is determined whether or not the sampling process has been executed for the object image for one screen as in S140, so that it is determined whether or not the scanning of the object image for the one screen has been completed. When the scanning of the object image for the one screen has not been completed, the process again proceeds to S180. To the contrary, when the scanning of the object image for the one screen has been completed, the process proceeds to S200 in which second image data based on the millimetric wave of the second frequency band f2 is generated from the detection voltage of the object image for the one screen sampled in S180 and then temporarily stored in the external storage device 38.

Figure 5:
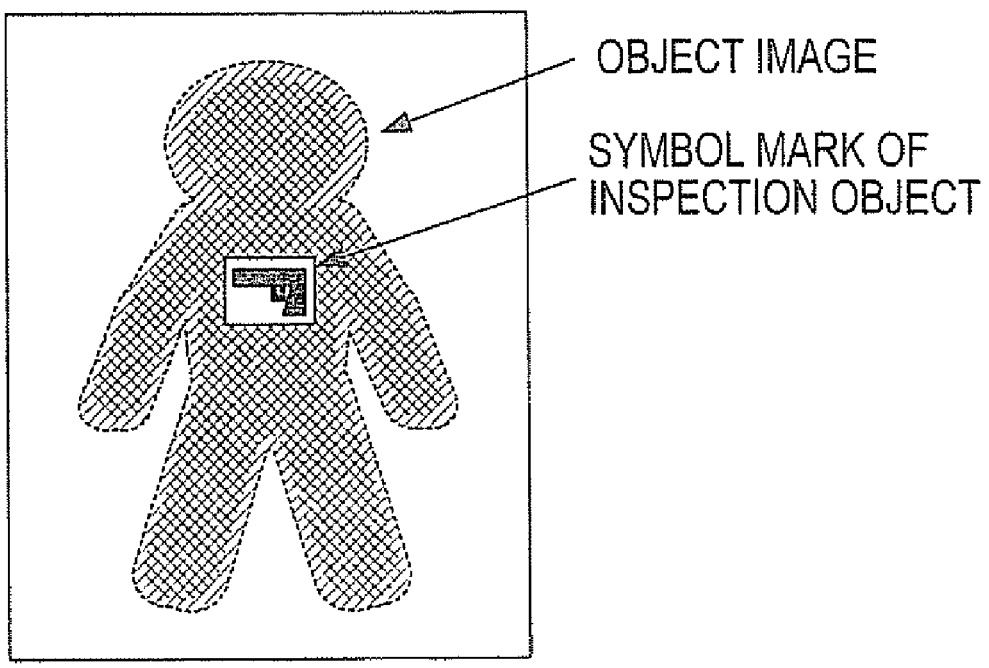
FIG. 5 is a view illustrating an example of a captured image displayed on a display and a symbol mark of an inspection object.

In S210, the first and second image data temporarily stored in the external storage device 38 in S150 and S200 are synthesized to generate final image data representing an image of the object 2, which is then stored in the external storage device 38. In addition, as exemplified in FIG. 5, based on the generated final image data, the image of the object 2 (captured image) is displayed on the display 35 through the display controller 36.

When the final image data is generated and displayed on the display 35 as described above, in S220, the shape data of the inspection object 4 (gun, knife and the like) is read out from the external storage device 38, and based on the shape data, the final image data is searched to determine whether or not an image identical or similar to the shape data exists in the captured image.

Subsequently, in S230, it is determined whether or not it is recognized that the image of the inspection object 4 exists in the captured image through the determination process of S220. When the image of the inspection object 4 is not recognized, the object inspecting process is terminated and the process again proceeds to S110. To the contrary, when the image of the inspection object 4 is recognized, a symbol mark, which schematically represents the recognized inspection object 4, is overlapped on the captured image that is being displayed on the display 35, as exemplified in FIG. 5, and the process again proceeds to S110.

As described above, according to the security check device 10 of this embodiment, the object 2 is imaged from the millimetric wave radiated from the object 2, so that the image data of the projected image projecting the inspection object hidden in the clothes and the like of the object 2 is generated and displayed on the display 35.

When generating the image data, the object image formed by the lens antenna 12 is scanned in the horizontal (x-axis) and vertical (y-axis) directions through the polygon mirror 14, the respective millimetric waves corresponding to the respective pixels of the object image sequentially enter the receiving portion 20 and the detection signals outputted from the receiving portion 20 are sequentially sampled, so that the image data is generated.

Due to this, according to this embodiment, while the planar antenna in which a plurality of antenna elements are arranged in a two-dimensional form as the prior art is not used, the millimetric wave image can be captured. As a result, it is possible to downsize the imaging portion and to reduce the costs.

In addition, according to the invention, the receiving portion 20 is configured to be able to change the frequency of the millimetric wave received and detected to one of the first frequency band f1 and the second frequency band f2. When the image processor 30 actually generates the image data, the image processor 30 sequentially receives the detection signals, which are obtained by detecting the received signals of the respective frequency bands f1 and f2, so that the image processor 30 generates the image data of two types and synthesizes the respective image data to generate the final image data for display.

Due to this, according to this embodiment, even when a member exists around the object 2 or in the clothes, which absorbs the millimetric wave of a specific frequency, it is possible to prevent the image data to be finally obtained from having a negative effect on the detection of the inspection object 4 due to the member.

In addition, according to this embodiment, when the image processor 30 displays the captured image of the object 2 based on the final image data on the display 35, the final image data is searched based on the shape data of the inspection object stored in the external storage device 38, and thereby it is determined whether or not an image identical or similar to the shape data is included in the final image data. When an image identical or similar to the shape data (for example, image of the inspection object 4 such as gun, knife and the like) is included, a symbol mark which schematically represents the inspection object is displayed to be overlapped on the captured image.

Due to this, according to the security check device of this embodiment, when the object 2 hides the inspection object 4, the fact is automatically detected, so that, a symbol mark of the inspection object 4 can be displayed on the display screen of the captured image. Thus, from the displayed image, an inspector can easily find out the inspection object 4 hidden by the object 2.

In this embodiment, the base 15 of the polygon mirror 14, the motor 16 for adjusting an azimuth, the motor 17 for adjusting an elevation angle and the position controller 32 correspond to the scanning unit of the invention. Further, in this embodiment, the processes of S110-S210 in the object inspecting process executed by the image processor 30 correspond to the image data generating unit of the invention, the process of S220 corresponds to the article recognizing unit of the invention, and the display controller 36 and the processes of S210, S230 and S240 executed by the image processor 30 so as to display the captured image and the symbol mark correspond to the display control unit of the invention.

While the embodiment of the invention has been described above, the invention is not limited to the above embodiment, but can be practiced in various manners without departing from the scope of the invention.

For example, according to the above embodiment, the shape data of the inspection object 4 is stored in the external storage device 38 constituted by a memory, a hard disk and the like and is used to determine whether or not an article appears in the captured image. Then, the determination result is displayed as a symbol mark of the article on the display together with the captured image. However, it may be possible to notify an inspector of whether or not the inspection object 4 exists without performing the process of recognizing the inspection object 4 using the shape data.

Figure 6A:
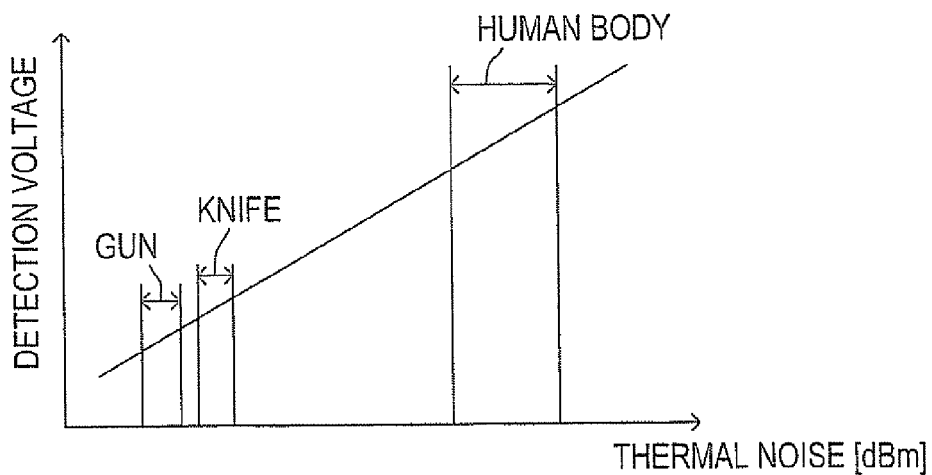
FIGS. 6A-6B illustrate a modification of a method for displaying a captured image on a display.

To be more specific, when the object 2 hides a gun or knife that is the inspection object 4, thermal noises of the gun or knife are different from thermal noises of the human body that is the object 2 and the detection voltages that determine pixel values of each pixel of the captured image are also different, as shown in FIG. 6A. Hence, the thermal noises (i.e., detection voltages) of the object 2 and each inspection object 4 when the object 2 hides the inspection object 4 are measured in advance and stored as identification data thereof in the external storage device 38 that is a storage unit.

Then, when the captured image is displayed from the final image data in S210 of FIG. 4, the identification data are used to execute a process as the position specifying unit which specifies positions of the object 2 and each inspection object 4 in the captured image. In the image areas of the specified object and each inspection object 4, the captured image is displayed with colors for identification display which is different from the typical gradation display based on the detection voltages.

Figure 6B:
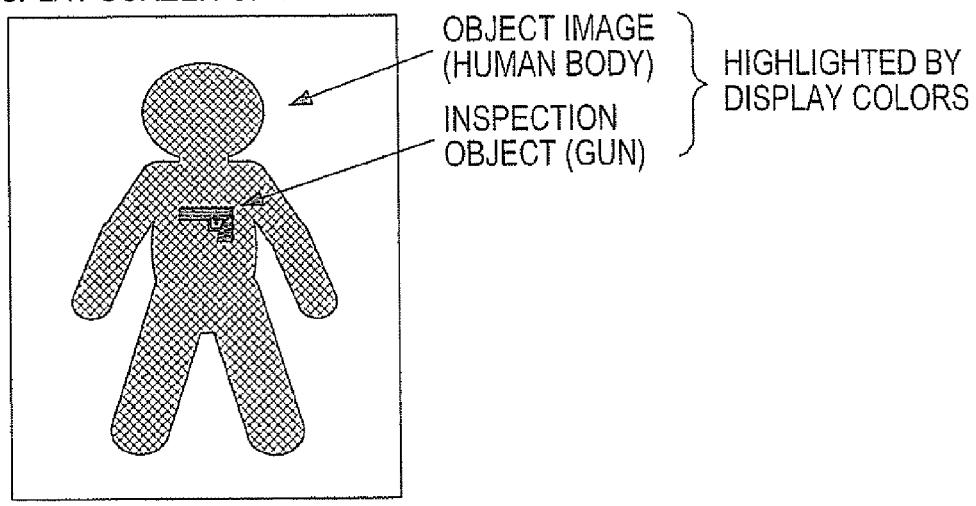

By doing so, the images of the object 2 and the inspection object 4 are highlighted on the display 35, as exemplified in FIG. 6B, and the inspector can easily find out the inspection object 4 from the displayed images.

The invention claimed is:

1. A millimetric wave imaging device comprising:
   a lens antenna that transmits millimetric wave radiated from an object to form an object image using the millimetric wave at a predetermined rear position;
   a polygon mirror that is arranged in a proximity of an object image forming position of the lens antenna, a side wall thereof forming a polyhedron around a rotation axis and being formed as a mirror surface reflecting the millimetric wave forming the object image;
   a receiving portion that receives the millimetric wave reflected on the mirror surface of the polygon mirror and detects a signal level thereof;
   a scanning unit that reflects the millimetric wave at each position of the object image to the receiving portion by rotating the polygon mirror around the central rotation axis and around an axis perpendicular to the central rotation axis; and
   an image data generating unit that generates image data representing the object image by receiving a detection signal from the receiving portion while driving the polygon mirror through the scanning unit.

2. The millimetric wave imaging device according to claim 1, wherein the receiving portion is configured to be able to change a frequency of the millimetric wave whose signal level is to be detected, and the image data generating unit changes the frequency of the millimetric wave for which the receiving portion detects the signal level to generate a plurality of types of image data and synthesize the image data to generate final image data.

3. A captured image display device displaying on a display unit an image captured by the millimetric wave imaging device according to claim 1, the captured image display device comprising:
   a storage unit that stores shape data of an article to be inspected;
   an article recognizing unit that searches the image data generated by the millimetric wave imaging device based on the shape data stored in the storage unit to determine whether or not the article is included in the captured image; and
   a display control unit that, when it is determined by the article recognizing unit that the article is included in the captured image, displays the captured image on the display unit based on the image data generated by the millimetric wave imaging device and a symbol mark schematically representing the article in the displayed image, and when it is not determined by the article recognizing unit that the article is included in the captured image, displays only the captured image on the display unit.

4. A captured image display device displaying on a display unit an image captured by the millimetric wave imaging device according to claim 1, the captured image display device comprising:
   a storage unit that stores identification data for specifying an object and an article to be inspected from pixel values of image data generated by the millimetric wave imaging device based on thermal noises of the object and the article;
   a position specifying unit that searches the image data generated by the millimetric wave imaging device based on the identification data stored in the storage unit to specify positions of the object and the article in the captured image; and a display control unit that displays the captured image on the display unit based on the image data generated by the millimetric wave imaging device and highlights the object and the article having the positions specified by the position specifying unit in the displayed image so as to distinguish the object and the article from the other display areas.

5. A captured image display device displaying on a display unit an image captured by the millimetric wave imaging device according to claim 2, the captured image display device comprising:

a storage unit that stores shape data of an article to be inspected;

an article recognizing unit that searches the image data generated by the millimetric wave imaging device based on the shape data stored in the storage unit to determine whether or not the article is included in the captured image; and a display control unit that, when it is determined by the article recognizing unit that the article is included in the captured image, displays the captured image on the display unit based on the image data generated by the millimetric wave imaging device and a symbol mark schematically representing the article in the displayed image, and when it is not determined by the article recognizing unit that the article is included in the captured image, displays only the captured image on the display unit.

6. A captured image display device displaying on a display unit an image captured by the millimetric wave imaging device according to claim 2, the captured image display device comprising:

a storage unit that stores identification data for specifying an object and an article to be inspected from pixel values of image data generated by the millimetric wave imaging device based on thermal noises of the object and the article;

a position specifying unit that searches the image data generated by the millimetric wave imaging device based on the identification data stored in the storage unit to specify positions of the object and the article in the captured image; and a display control unit that displays the captured image on the display unit based on the image data generated by the millimetric wave imaging device and highlights the object and the article having the positions specified by the position specifying unit in the displayed image so as to distinguish the object and the article from the other display areas.

* * * * *